(12) United States Patent
Chen et al.

(10) Patent No.: US 8,302,004 B2
(45) Date of Patent: Oct. 30, 2012

(54) METHOD OF DISPLAYING MENU ITEMS AND RELATED TOUCH SCREEN DEVICE

(75) Inventors: Hsueh-Chun Chen, Taoyuan County (TW); Yuan-Chen Chang, Tao-Yuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 621 days.

(21) Appl. No.: 12/325,271

(22) Filed: Dec. 1, 2008

(65) Prior Publication Data

US 2009/0172531 A1 Jul. 2, 2009

(30) Foreign Application Priority Data

Dec. 31, 2007 (TW) .............................. 96151654 A

(51) Int. Cl.
*G06F 3/48* (2006.01)
(52) U.S. Cl. ........ 715/702; 715/825; 715/800; 715/811; 345/173
(58) Field of Classification Search .................... 715/702
See application file for complete search history.

(56) References Cited

U.S. PATENT DOCUMENTS

| | | | | |
|---|---|---|---|---|
| 5,661,632 A * | 8/1997 | Register | ...................... | 361/679.3 |
| 6,847,387 B2 * | 1/2005 | Roth | .............. | 715/811 |
| 7,103,852 B2 * | 9/2006 | Kairis, Jr. | ...................... | 715/800 |
| 7,665,039 B2 * | 2/2010 | Chaudhri et al. | .............. | 715/830 |
| 7,725,836 B2 * | 5/2010 | Moehrle | ........ | 715/811 |
| 7,812,817 B2 * | 10/2010 | Robertson et al. | ............ | 345/156 |
| 7,864,163 B2 * | 1/2011 | Ording et al. | ................ | 345/173 |
| 7,884,807 B2 * | 2/2011 | Hovden et al. | ................ | 345/173 |
| 2002/0112237 A1 * | 8/2002 | Kelts | .............. | 725/39 |
| 2004/0201576 A1 | 10/2004 | Shimada | | |
| 2005/0114788 A1 * | 5/2005 | Fabritius | ...................... | 715/767 |
| 2005/0154798 A1 * | 7/2005 | Nurmi | ................ | 710/1 |
| 2006/0218502 A1 | 9/2006 | Matthews | | |
| 2007/0083827 A1 * | 4/2007 | Scott et al. | .................... | 715/811 |
| 2007/0174782 A1 * | 7/2007 | Russo | .......... | 715/781 |
| 2007/0220444 A1 * | 9/2007 | Sunday et al. | ............... | 715/788 |
| 2008/0012825 A1 * | 1/2008 | Robertson et al. | ............ | 345/156 |
| 2008/0094368 A1 * | 4/2008 | Ording et al. | ................ | 345/173 |
| 2008/0165152 A1 * | 7/2008 | Forstall et al. | ............... | 345/173 |
| 2008/0174570 A1 * | 7/2008 | Jobs et al. | ..................... | 345/173 |

(Continued)

FOREIGN PATENT DOCUMENTS

CN 1240966 A 1/2000

(Continued)

OTHER PUBLICATIONS

Forstall et al., Modal change based on orientation of a portable multifunction device, U.S. Appl. No. 60/947,300, filed Jun. 29, 2007.*

(Continued)

*Primary Examiner* — William Bashore
*Assistant Examiner* — Reza Nabi
(74) *Attorney, Agent, or Firm* — Winston Hsu; Scott Margo

(57) ABSTRACT

To improve usability of a touch screen device for input with a finger, a method of displaying a plurality of text-based items in the touch screen device includes the touch screen device displaying a predetermined item of the plurality of text-based items as an icon, and the touch screen device displaying the plurality of text-based items less the predetermined item with an increased display size.

19 Claims, 4 Drawing Sheets

U.S. PATENT DOCUMENTS

| | | | |
|---|---|---|---|
| 2008/0284738 A1* | 11/2008 | Hovden et al. | 345/173 |
| 2009/0179854 A1* | 7/2009 | Weber et al. | 345/156 |
| 2009/0225026 A1* | 9/2009 | Sheba | 345/156 |
| 2010/0070926 A1* | 3/2010 | Abanami et al. | 715/835 |
| 2010/0088639 A1* | 4/2010 | Yach et al. | 715/825 |
| 2010/0134432 A1* | 6/2010 | Seo | 345/173 |
| 2010/0156808 A1* | 6/2010 | Stallings et al. | 345/173 |

FOREIGN PATENT DOCUMENTS

| | | |
|---|---|---|
| CN | 2831631 Y | 10/2006 |
| TW | 200622893 | 7/2006 |
| WO | 9966395 A2 | 12/1999 |
| WO | WO 99/66395 * | 12/1999 |
| WO | 2006101508 A1 | 9/2006 |
| WO | 2007123573 A1 | 11/2007 |

OTHER PUBLICATIONS

Dave Mark et al, Beginning iPhone Development Exploring the iPhone SDK, Published on Nov. 2008, 46 pages.*

Office action mailed on Sep. 14, 2011 for the Taiwan application No. 096151654, filing date Dec. 31, 2007, p. 1-6.

* cited by examiner

METHOD OF DISPLAYING MENU ITEMS AND RELATED TOUCH SCREEN DEVICE

BACKGROUND OF THE INVENTION

1. Field of the Invention

The present invention relates to methods of displaying menu items in touch screen devices, and more particularly, to a method of displaying menu items in a touch screen device which is suitable for input by a finger.

2. Description of the Prior Art

On many electronic devices, such as PDAs, touch screens are used as a primary input device. When using a touch screen, users simply make contact with a point or area corresponding to an item on the screen with a stylus or their finger to select the item on the screen, and thereby input text, or launch a program or application. Touch screens often suffer certain limitations and disadvantages. For example, a stylus is small enough for precision pointing. On many occasions, however, a stylus may not be available, or a user may be in a hurry, and prefer to use their finger to activate touch controls on the touch screen. However, a user's finger may be too large for accurate contact, especially if the controls are in close proximity to one another. This lack of precision often results in wrong controls being selected on smaller panel displays.

One possible solution is to increase the size of the panel display so a user's finger can select screen controls more comfortably and accurately. However, since people usually want their PDA phones and many other electronic devices to be as small as possible without sacrificing functionality, increasing the panel size would likely be unpopular with consumers. Another solution would be to increase the size of the panel controls, but this would dramatically limit the number of display controls that could be shown in the display area, or it would clutter the display.

SUMMARY OF THE INVENTION

According to an embodiment of the present invention, a method of displaying a plurality of text-based items in a touch screen device comprises the touch screen device displaying a predetermined item of the plurality of text-based items as an icon, and the touch screen device displaying the plurality of text-based items less the predetermined item with an increased display size.

According to the above embodiment, a touch screen device comprises a touch screen for displaying a user interface of the mobile device, a memory storing program code, a plurality of text-based items, and a plurality of icons corresponding to the plurality of text-based items, and a processor coupled to the touch screen and the memory for controlling the touch screen to modify the user interface to display a predetermined item of the plurality of text-based items as a predetermined icon of the plurality of icons, and to increase display size of the plurality of text-based items less the predetermined item according to the program code.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
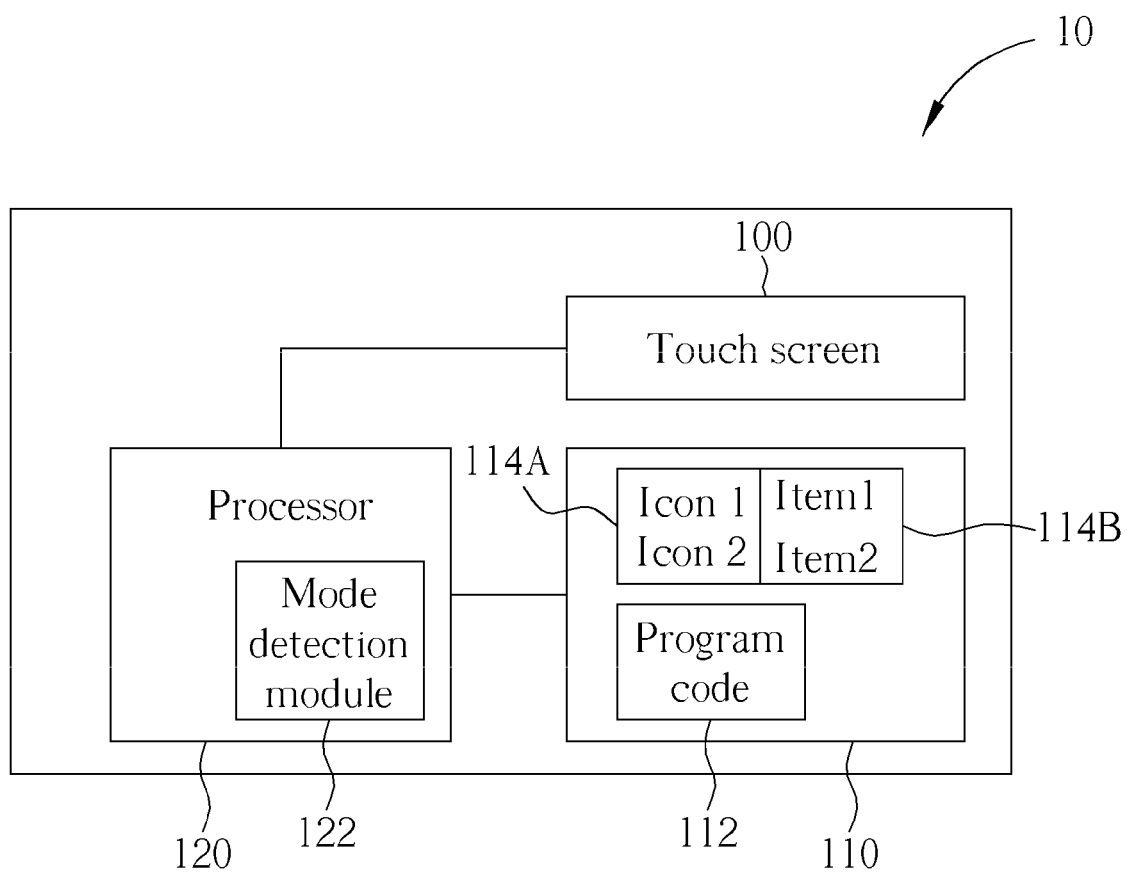
FIG. 1 is a diagram of a touch screen device according to an embodiment of the present invention.

Please refer to FIG. 1, which is a function block diagram of a touch screen device 10 capable of displaying a menu with increased display size according to an embodiment of the present invention. The touch screen device 10 comprises a memory 110 storing program code 112, a plurality of icons 114A, and a plurality of text-based items 114B corresponding to the plurality of icons 114A. Each icon/text-based item pair may correspond to a function of the touch screen device 10, such as a "Dial" function, a "Calculator" function, etc. Further, not every function necessarily has both a corresponding icon and text-based item. Some functions may only have a corresponding icon, and other functions may only have a corresponding text-based item. The touch screen device 10 further comprises a touch screen 100 for displaying the icons 114A and/or the text-based items 114B in a user interface, and a processor 120 for controlling the touch screen 100 according to the program code 112. The touch screen device 10 may be a smartphone, a PDA, a PDA phone, a pocket PC, a mobile device, or a portable music player. The touch screen device 10 may utilize an operating system to provide file management, a graphical user interface, and other functions. An example of such an operating system could be a Windows Mobile, Windows CE, Symbian, Palm, Android or Linux operating system.

Figure 2:
FIG. 2 is a diagram of the touch screen device displaying a menu in profile mode according to the embodiment.
Figure 3:
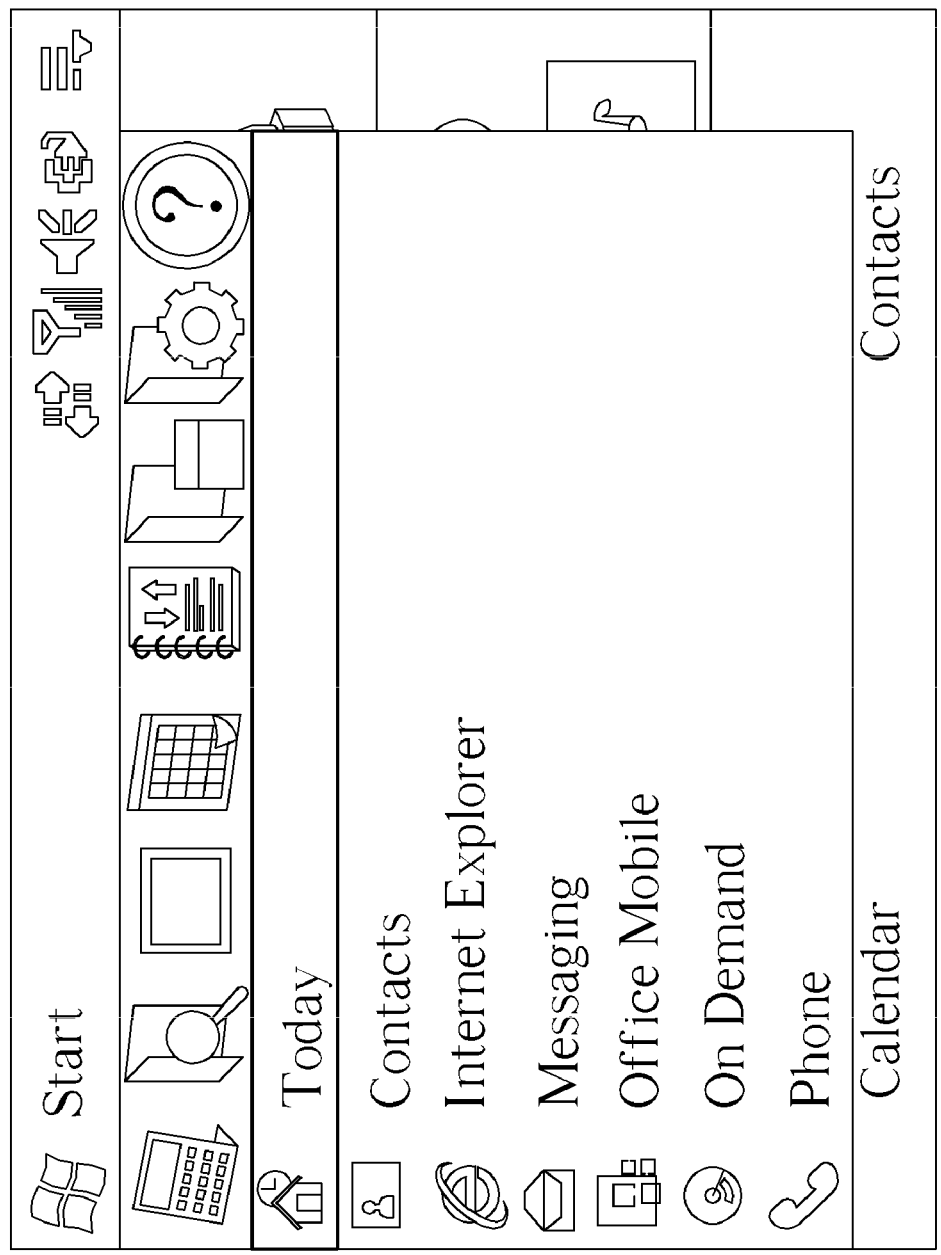
FIG. 3 is a diagram of the touch screen device displaying a menu in landscape mode according to the embodiment.

Please refer to FIG. 2 and FIG. 3, which are diagrams of displaying a menu of the text-based items 114B in the touch screen device 10 in portrait mode and landscape mode, respectively. In portrait mode (shown in FIG. 2), the menu may be accessed by activating a "Start" button, and may comprise a plurality of menu items, such as "Today," "Phone," "Contacts," and "Internet Explorer" menu items. The menu items displayed in the touch screen 100 may further include a group of most recently used (MRU) or most commonly used (MCU) menu items. The most recently used menu items may comprise a number of menu items that were selected most recently by a user. For example, if a user just used a Calculator function, represented by a "Calculator" menu item, the "Calculator" menu item may appear in the plurality of MRU menu items. On the other hand, the MCU menu items may comprise a number of menu items that are selected most often by the user. For example, if the user selects the "MSN Messenger" menu item 20% of the time over a predetermined period of time, then the "MSN Messenger" menu item may show up in the plurality of MCU menu items. The menu may further comprise a plurality of preset menu items that are always displayed, which may include "Programs," "Settings," and "Help" menu items. In portrait mode, height of the display is longer than width of the display, such that relatively more text-based items 114B may be displayed, and relatively fewer icons 114A may be displayed.

In landscape mode, in which width of the display is longer than height of the display, the number of icons 114A may be increased to have more activation buttons than those in portrait mode, as shown in FIG. 3. On the other hand, because height is lowered relative to the portrait mode described above, number of the text-based list items 114B displayed on the screen may be decreased. The processor 120 may comprise a mode detection module 122 for determining when the touch screen device 10 is operated in the portrait mode or in the landscape mode. When the touch screen device 10 operates in the landscape mode, the processor 120 may control the touch screen 100 to display the icons 114A with reduced size, display a second item of the plurality of text-based items 114B as a corresponding icon, and display the plurality of text-based items 114B less a predetermined item, e.g. the MRU and/or MCU menu items, and the second item with an increased display size. The increased display size may be stored in the memory 110 or may be calculated by the processor 120.

As shown in FIG. 2 and FIG. 3, some of the "text-based" menu items 114B may be removed from the display of the plurality of menu items and instead may be displayed as corresponding icons of the plurality of icons 114A at the top of the menu. Because the icons 114A are a compact form for displaying the items 114B, space is saved along the vertical axis, or height of the display. For example, the processor 120 may control the touch screen 100 to display all or some of the MRU menu items, the MCU menu items, or the preset menu items in the icon form at the top of the menu. In other words, the predetermined item may be any of the above menu items. Then, the space that is saved can be redistributed to the remaining text-based menu items in the plurality of menu items minus the menu items displayed in the icon form. For example, the processor 120 may control the touch screen 100 to display the text-based menu items with an increased spacing size. Or, the processor 120 may control the touch screen 100 to display each text-based menu item with an increased font size. Or, a combination of these two methods may be employed, the end result being that the menu items are displayed with an increased display size, making it easier for the user to control the touch screen device menu with their finger. The increased font size and the increased spacing size may be stored in the memory 110, or may be calculated by the processor 120 corresponding to how many icons 114A and how many items 114B are displayed. Please note that "text-based" is a term used to indicate a difference from the icon form. The "text-based" menu items are not limited to text, and may be displayed in practice as an image, without any character data included. The "text-based" menu items may also combine icons and text together. However, the icon form refers to displaying one item with only one icon.

Figure 4:
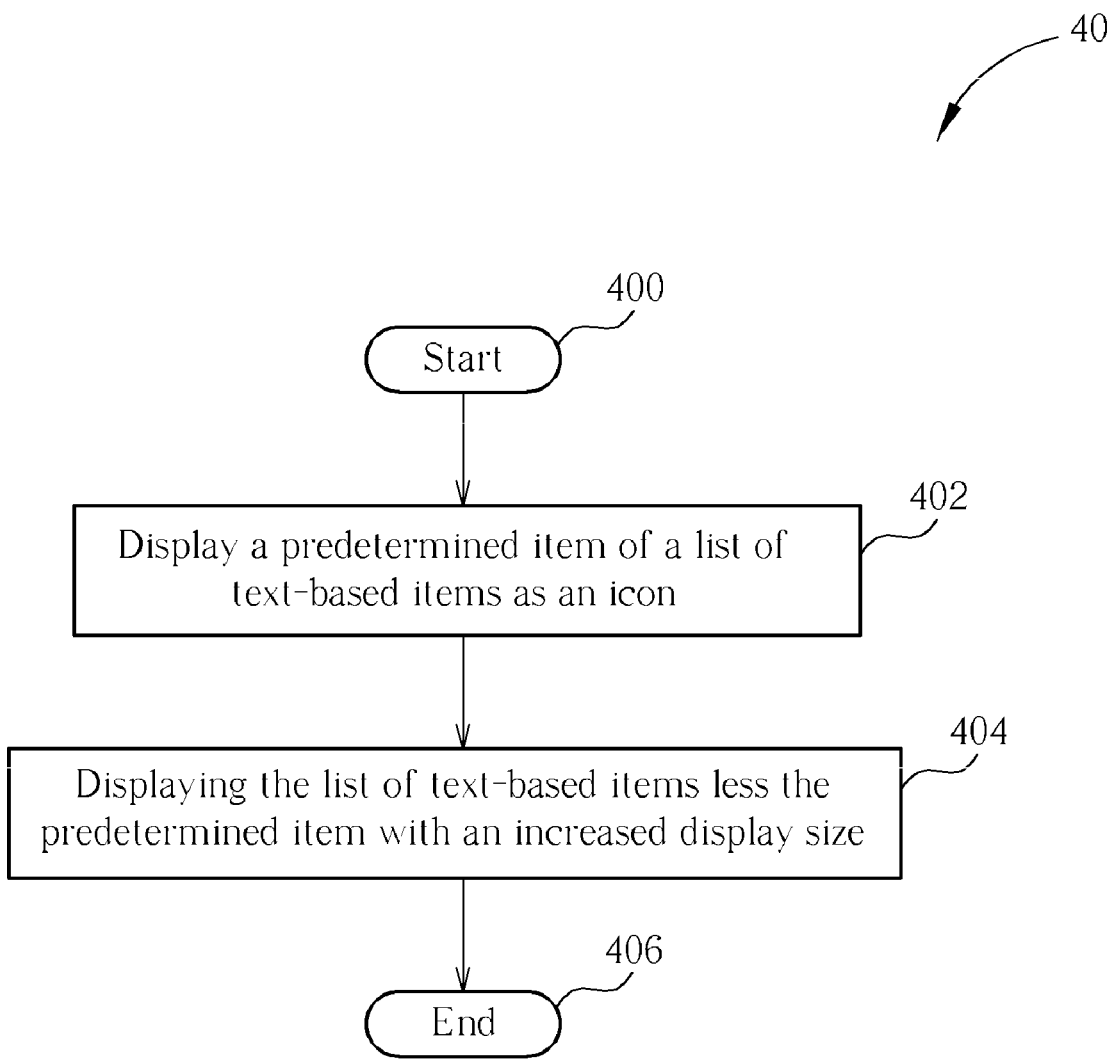
FIG. 4 is a flowchart of a method of displaying a menu in the touch screen device according to the embodiment.

Please refer to FIG. 4, which is a flowchart of a process 40 for displaying the plurality of text-based items in the touch screen device. The process 40 could be implemented by the program code 112 of the touch screen device mentioned above, and comprises the following steps:

Step 400: Start.

Step 402: Display a predetermined item of a plurality of text-based items as an icon.

Step 404: Display the plurality of text-based items less the predetermined item with an increased display size.

Step 406: End.

In the process 40, the predetermined item, e.g. an MRU menu item, an MCU menu item, or the preset menu item mentioned above, is displayed as an icon (Step 402). Then, the plurality of text-based items is displayed less the predetermined item (Step 404). The increased display size can be accomplished through either of the methods mentioned above, i.e. increasing spacing or increasing font size, or both. Finally, the touch screen device may further remove the predetermined item from the plurality of text-based items before displaying the menu.

Using the method of the present invention, the touch screen device is able to improve upon the prior art by making the menu more usable by a user who selects the menu items with their finger, as opposed to a stylus. This allows the user to access the menu items more conveniently, and reduces the probability that the user will select the wrong menu item when using their finger.

Those skilled in the art will readily observe that numerous modifications and alterations of the device and method may be made while retaining the teachings of the invention.

What is claimed is:

1. A method of displaying a plurality of text-based items in a touch screen device, the method comprising:

in response to rotation of the device to be in a landscape orientation, the touch screen displaying at the top of the menu only an icon of at least one of a predetermined plurality of icon and text label pairs, and displaying along the vertical axis both an icon and text label of remaining of the predetermined plurality of icon and text label pairs in a first display size; and in response to rotation of the device to be in a portrait orientation, moving at least one of the icon from the top of the menu to the remaining of the predetermined plurality of icons and text label pairs displayed along the vertical axis wherein the remaining of the predetermined plurality of icons and text label pairs along the vertical axis are displayed in second display size smaller than the first display size.

2. The method of claim 1, wherein the touch screen device displaying both the icon and the text label pair of the remaining icon and the text label pairs in the first display size comprises the touch screen device displaying both the icon and the text label pair of the remaining icon and the text label pairs with an increased font size.

3. The method of claim 1, wherein the touch screen device displaying both the icon and the text label pair of the remaining icon and the text label pairs in the first display size comprises the touch screen device displaying both the icon and the text label pair of the remaining icon and the text label pairs with an increased spacing size.

4. The method of claim 1, further comprising the touch screen device removing at least one of the predetermined plurality of icon and text label pairs from the plurality of text icon and text label pairs.

5. The method of claim 1, wherein the at least one of the predetermined plurality of icon and text label pairs is a most commonly used (MCU) function, or a most recently used (MRU) function.

6. The method of claim 1, further comprising the touch screen device detecting that the touch screen device is operating in landscape mode or in portrait mode for displaying a corresponding format of both the icon and the text label pair of the remaining icon and the text label pairs.

7. The method of claim 1, wherein the touch screen device is a smartphone, a PDA, a PDA phone, a Touch phone, a pocket PC, a mobile device, or a portable music player.

8. The method of claim 1, wherein the touch screen device utilizes a Windows Mobile, Windows CE, Symbian, Palm, Android or Linux operating system.

9. The method of claim 1, wherein the at least one of the predetermined plurality of icon and text label pairs is a most commonly used function.

10. A touch screen device comprising:

a touch screen for displaying a user interface of the mobile device;

a memory storing program code and a plurality of icon and text label pairs and a processor coupled to the touch screen and the memory for controlling the touch screen to modify the user interface in response to rotation of the device to be in a landscape orientation, the touch screen displaying at the top of the menu only an icon of at least one of a predetermined plurality of icon and text label pairs, and displaying along the vertical axis both an icon and text label of remaining of the predetermined plurality of icon and text label pairs in a first display size; and in response to rotation of the device to be in a portrait orientation, moving at least one of the icon from the top of the menu to the remaining of the predetermined plurality of icons and text label pairs displayed along the vertical axis wherein the remaining of the predetermined plurality of icons and text label pairs along the vertical axis are displayed in second display size smaller than the first display size.

11. The touch screen device of claim 10, wherein the memory further stores an increased font size, and the processor controls the touch screen to display both the icon and the text label pair of the remaining icon and the text label pairs with in the first display size by controlling the touch screen to display both the icon and the text label pair of the remaining icon and the text label pairs with the increased font size.

12. The touch screen device of claim 10, wherein the memory further stores an increased spacing size, and the processor controls the touch screen to display both the icon and the text label pair of the remaining icon and the text label pairs with in the first display size by controlling the touch screen to display both the icon and the text label pair of the remaining icon and the text label pairs with an increased spacing size.

13. The touch screen device of claim 10, wherein the processor controls the touch screen to remove display of the at least one of the predetermined plurality of icon and text label pairs from the display of the plurality of text icon and text label pairs.

14. The touch screen device of claim 10, wherein the at least one of the predetermined plurality of icon and text label pairs corresponds to a most commonly used (MCU) function or a most recently used (MRU) function.

15. The touch screen device of claim 10, wherein the processor comprises a mode detection module for detecting that the touch screen device is operating in landscape mode or in portrait mode for displaying a corresponding format of the icons and both the icon and the text label pair of the remaining icon and the text label pairs.

16. The touch screen device of claim 15, wherein when the touch screen device operates in landscape mode, the processor further controls the touch screen to display the icon with reduced size, display a second item of the plurality of text icon and the text label pairs as only an icon, and display both the icon and the text label pair of the remaining icon and the text label pairs minus the second item with an increased display size.

17. The touch screen device of claim 10, wherein the touch screen device is a smartphone, a PDA, a Touch phone, a PDA phone, a pocket PC, a mobile device, or a portable music player.

18. The touch screen device of claim 10, wherein the touch screen device utilizes a Windows Mobile, Windows CE, Symbian, Palm, or Android, Linux operating system.

19. A non-transitory storage medium having stored thereon instructions that, when executed by a processor of a touch screen device, causes the processor to perform a method for displaying a plurality of text-based items in said touch screen device, the method comprising:

in response to rotation of the device to be in a landscape orientation, the touch screen displaying at the top of the menu only an icon of at least one of a predetermined plurality of icon and text label pairs, and displaying along the vertical axis both an icon and text label of remaining of the predetermined plurality of icon and text label pairs in a first display size; and in response to rotation of the device to be in a portrait orientation, moving at least one of the icon from the top of the menu to the remaining of the predetermined plurality of icons and text label pairs displayed along the vertical axis wherein the remaining of the predetermined plurality of icons and text label pairs along the vertical axis are displayed in second display size smaller than the first display size.

* * * * *